Patented Mar. 4, 1924.

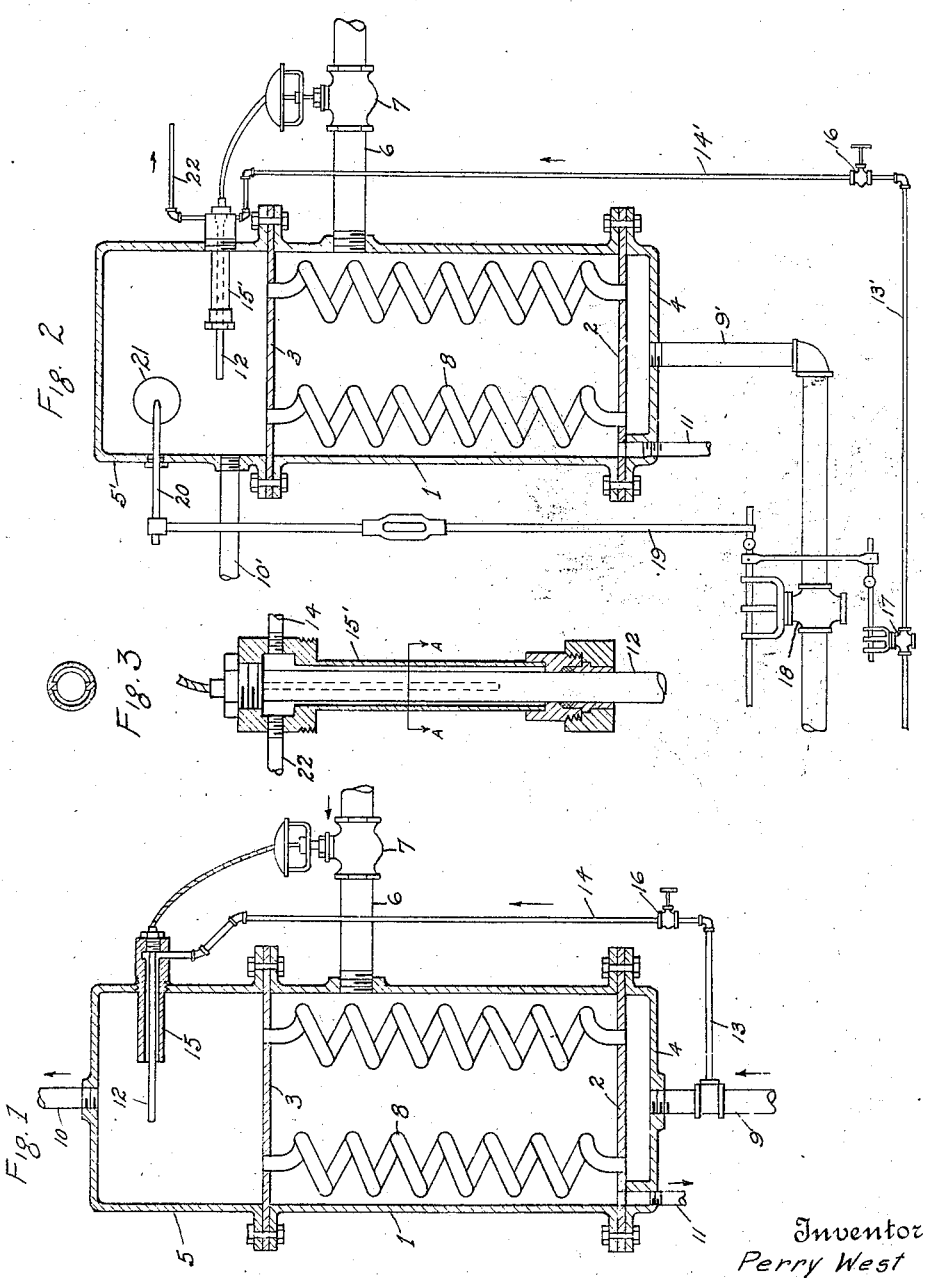

1,485,897

UNITED STATES PATENT OFFICE.

PERRY WEST, OF NEWARK, AND EARL P. MASON, OF SUMMIT, NEW JERSEY, ASSIGNORS TO ANTI-CORROSION ENGINEERING COMPANY, INC., A CORPORATION OF NEW YORK.

TEMPERATURE-CONTROLLING DEVICE.

Application filed June 20, 1921. Serial No. 478,849.

*To all whom it may concern:*

Be it known that PERRY WEST and EARL P. MASON, citizens of the United States, and residents, respectively, of Newark, Essex Co., and Summit, in the county of Union and State of New Jersey, have invented certain new and useful Improvements in Temperature-Controlling Devices, of which the following is a specification.

This invention relates to apparatus or an arrangement of devices for controlling the temperature of a fluid in a fluid heater.

The particular object of this invention is to provide an improved means or arrangement whereby the action of the controlling means may be accelerated and the temperature of the fluid passing through the heater may be automatically kept substantially constant with varying rate of flow.

To accomplish this result we utilize a heater of any suitable form provided with a thermostatic regulator, which may be of standard construction, for controlling the operation of the heating medium and operated primarily by the heated fluid.

In connection with the thermostatic regulator we provide a supplementary or auxiliary means, which co-operates with the fluid passing through the heater to operate the regulator, as will be more fully explained and understood in connection with the description of the arrangement shown in the accompanying drawings, wherein one embodiment and a modification thereof of the invention is shown.

In the drawings like parts in the several views have been given the same reference numerals.

Fig. 1, is a vertical section of a water heater illustrating one embodiment of the invention.

Fig. 2, is a similar view to Fig. 1, illustrating a modification of the arrangement.

Fig. 3, is an enlarged detail sectional view of the thermostatic regulator as adapted for use in connection with the arrangement shown in Fig. 2.

As shown in Fig. 1, the heater comprises a body portion 1 closed at its ends by the walls, 2 and 3 and the caps 4 and 5, forming three chambers.

Steam is supplied to the chamber 1 from a supply pipe 6, controlled by the valve 7. One or more pipe coils, such as 8, are positioned in the chamber 1 and connect the lower chamber 4 with the upper chamber 5 and a water supply pipe 9 brings the water or other fluid to be heated to the chamber 4, from which it passes through the coils 8, to the chamber 5 and out of the pipe 10, being heated in the coils 8 by the steam passing into the chamber 1 from the steam pipe 6. The condensed steam is drawn off through the pipe 11 from the lower end of the chamber 1.

A temperature control device 12 is positioned in the upper chamber 5, and is connected to operate the steam valve 7 in the usual manner, that is, as the water in the chamber 5 reaches a certain pre-determined temperature the control device operates to close the valve 7 and shut off the steam from the heating chamber 1 until the temperature of the water falls, when the device opens the steam valve, again admitting steam to the chamber 1.

It will be seen that if water is drawn off from the chamber 5 through outlet pipe 10 this will tend to reduce the pressure in chamber 5 and cause the water from coils 8 to flow into same, such water upon leaving coils 8 being replaced by cold water coming in from chamber 4. Assuming that the apparatus is in operation under conditions of an intermittent and variable flow of water, and that we start with a condition where the water in the apparatus is at rest, and where after the last flow period the valve 7 was held open by the thermostat 12, so as to admit sufficient steam to heat the water in coils 8 and chamber 5 practically to the pre-determined temperature at which the thermostat is set, and that the thermostat then closed valve 7 until the next flow period;—it will be seen that if under these or similar conditions water is drawn off from chamber 5 through outlet pipe 10, the pressure in chamber 5 will be reduced and cause a flow of water from coils 8 into this chamber, the water leaving coils 8 being replaced by cold water from chamber 4. This action, involving the drawing of water from chamber 5 and the replacing of same by the water from coils 8, may continue for considerable time without materially reducing the temperature of the water in chamber 5 to such an extent as to cause thermostat 12 to again operate so as to open valve 7 and admit steam to chamber 1. In the meantime all of the heated water in coils 8 and a considerable proportion of the heated water in chamber 5 may be replaced by the cold water entering through pipe 9 before the temperature of the water around thermostat 12 in chamber 5 has been sufficiently changed to cause this thermostat to operate. Assuming the flow to continue to and beyond the point where the temperature will be sufficiently reduced to cause the thermostat to operate, it will readily be seen that some time must elapse between the time the thermostat operates and chamber 1 is very substantially filled with steam. In the meantime the cold water which has already passed through coils 8 and that which is still passing will not be sufficiently heated to prevent considerable drop in temperature of the water in chamber 5 below the temperature at which the regulator is adjusted to control. If the flow is allowed to continue, however, and the heating apparatus is of sufficient capacity, the temperature of the water leaving coils 8 will gradually rise and finally fill chamber 5 with water at a temperature sufficiently high to cause the thermostat to operate and close valve 7, thus stopping the steam supply to chamber 1 and preventing the overheating of the water. So long as this flow shall continue at a more or less uniform rate, this thermostat and its controlling valve 7 may operate so as to maintain a sufficiently constant temperature of the water in chamber 5 and in pipe 10 leaving the apparatus. As soon, however, as the rate of flow is materially diminished or practically stopped and then suddenly increased or started again, especially at a time just after the thermostat has operated to close valve 7, we will have a repetition of the above mentioned difficulty in securing a proper regulation of the temperature of the water leaving the apparatus.

To overcome this difficulty we provide a by-pass arrangement which, in the form shown in Fig. 1, comprises a pipe 13—14 connected at one end with the cold water supply pipe 9 and extending, outside of the heater, to a jacket 15 surrounding the temperature control device 12, which jacket extends and opens into the chamber 5, as shown. A valve 16 may be provided in the pipe 14 to regulate the flow through the by-pass arrangement.

The operation of this arrangement will be readily understood by reference to Fig. 1, and it will be seen that as soon as any water is drawn off from the chamber 5, the reduction in pressure in this chamber will cause water to flow not only through coils 8 but also through the bypass pipe 13—14. It will also be seen that with this arrangement the small quantity of cold water flowing directly through the said bypass and jacket 15 will reach the thermostat and reduce the temperature conditions immediately surrounding the same much sooner than these temperature conditions would otherwise be changed by the cooler water flowing through coils 8. This accelerates the operation of thermostat 12 and, consequently, the opening of steam valve 7 so as to allow steam to enter chamber 1 practically as soon as the flow through the heater starts instead of much later, as would be the case where thermostat 12 is actuated by temperature changes caused by the water flowing through coils 8 alone. The admitting of steam to chamber 1 as soon as water begins to flow through coils 8 permits all of this water to be heated instead of allowing a considerable quantity of cold water to pass before the steam is turned on, thus insuring a constant supply of heated water to chamber 5, within a very narrow temperature range.

The arrangement shown in Fig. 2 is similar to that just described and is designed for use in cases where it is desired to heat a different fluid from that utilized or best adapted to accelerate the action of the temperature control device. In this arrangement the general arrangement of the chambers 1, 4 and 5, heating coils 8 and steam supply 6 with its valve 7 is the same as in Fig. 1, but the by-pass pipes 13'—14' are connected to a separate source of supply of water or other suitable fluid at one end and a valve 17 is provided which is connected to and is opened or closed simultaneously with a valve 18, which controls the supply of fluid to be heated. This valve 18 is opened or closed by means of suitable link connections 19—20, the latter being operated by a float 21 in the chamber 5'.

The sleeve 15' around the temperature control device 12, in this arrangement, Fig. 2, is closed and may be constructed as shown in Fig. 3. With this construction the cold water entering the sleeve 15' from the by-pass pipe 14' is brought into contact with the temperature control device 12 and passes out through the pipe 22, instead of being discharged into the chamber 5, as in the Fig. 1 arrangement.

The operation of the arrangement shown in Fig. 2 will be apparent from the drawings. The hot water is drawn off from the chamber 5' through outlet pipe 10', the float 21 operating through links 20—19 causes both valves 17 and 18 to open and simultaneously permits the fluid to be heated to enter the heater and the temperature control device to operate, causing the steam to be admitted to the chamber 1 to heat the incoming fluid in the coils 8.

In the arrangement shown in Fig. 1, it will be seen that as soon as water is drawn off from the chamber 5 a difference in pressure is created which causes the water to flow from the supply pipe 9 through the heater and by-pass arrangement, simultaneously but when no water is being drawn off from the chamber 5 there will be no flow through either path, consequently, the water remaining in the jacket 15 becomes heated by the surrounding water, causing the control device to close the steam supply until the temperature falls to the predetermined point.

It will be understood that the invention is equally capable of adaptation to other uses than the one described and that the details of construction and arrangement may be changed to adapt it to various uses without departing from the spirit and scope of the invention as defined in the appended claims.

What we claim is:

1. In a device of the class described, the combination with a temperature controlling means normally operated by the flowing fluid whose temperature it controls, of means adapted to cause a fluid of different temperature to flow simultaneously therewith and to accelerate the operation of the temperature controlling means, and means to regulate the relative flow of said fluids.

2. In a device of the class described, in combination with a heater, a thermostatic regulator operated by the fluid in said heater to regulate the temperature thereof, and an auxiliary fluid supply means associated with said thermostatic regulator adapted to cause a fluid of different temperature to flow thereto as the fluid flows in said heater and to accelerate the normal operation of the thermostatic regulator.

3. In a device of the class described, in combination with a heater, a thermostatic regulator operated by the fluid in said heater to regulate the temperature thereof, and an auxiliary fluid supply means associated with said thermostatic regulator adapted to cause a fluid of different temperature to flow thereto as the fluid flows in said heater and to accelerate the normal operation of the thermostatic regulator, the flow in said auxiliary fluid supply means being regulated and controlled by the flow in said heater.

4. A device of the class described, comprising a heater provided with heating means adapted to heat a fluid flowing therethrough, a thermostatic regulator operated by the fluid in said heater to regulate the temperature thereof, and means for diverting a part of the fluid flowing to said heater and cause the same to effect an accelerated operation of said thermostatic regulator and the said heating means.

5. In a device of the class described, in combination with a heater, a thermostatic regulator operated by the fluid in said heater to regulate the temperature thereof, and an auxiliary fluid supply means associated with said thermostatic regulator adapted to cause a fluid of different temperature to flow thereto as the fluid flows in said heater and to accelerate the normal operation of the thermostatic regulator, said auxiliary fluid supply means being inoperative except when fluid flows to said heater.

6. A device of the class described, comprising a heater provided with heating means, a chamber for the heated fluid and a thermostatic regulator positioned in said chamber, means for conducting a fluid of lower temperature to said regulator, and means for causing the fluid to flow through said last named means simultaneously with the flow of fluid to said heater.

Signed at New York city, in the county of New York and State of New York this 15th day of June, A. D. 1921.

PERRY WEST.
EARL P. MASON.